May 13, 1952 A. P. LEINEN 2,596,337
FIXTURE AND HOLDER FOR FLUORESCENT LAMPS
Original Filed March 22, 1946 4 Sheets-Sheet 1

Inventor:
Arthur P. Leinen.
By Thiess, Olson & Mecklenburger
Attys

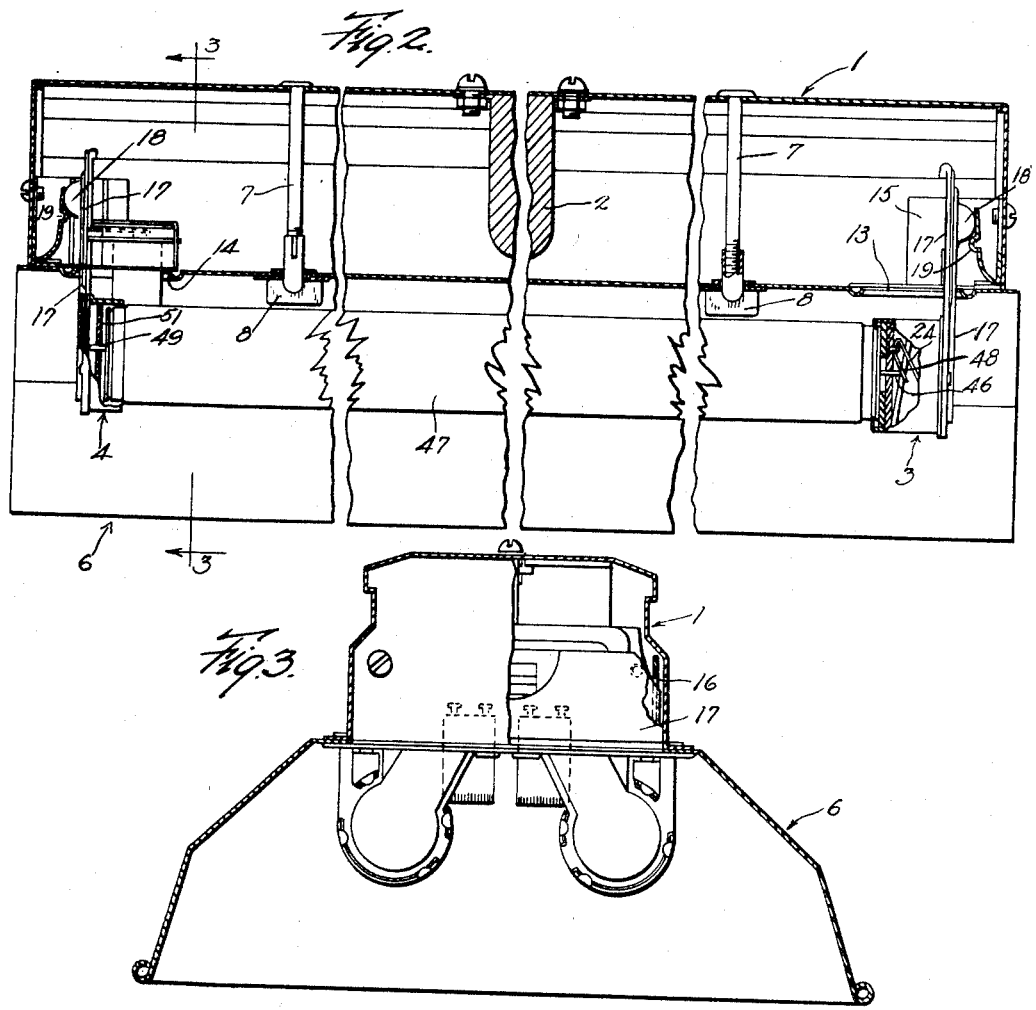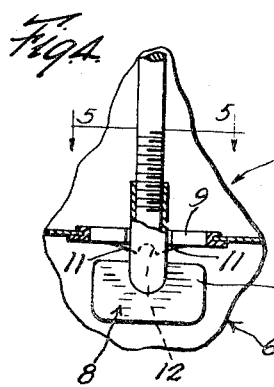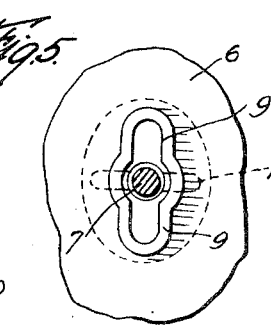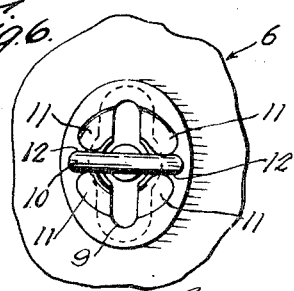

May 13, 1952          A. P. LEINEN          2,596,337
FIXTURE AND HOLDER FOR FLUORESCENT LAMPS
Original Filed March 22, 1946          4 Sheets-Sheet 3
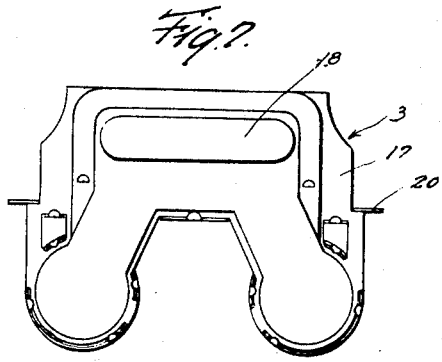
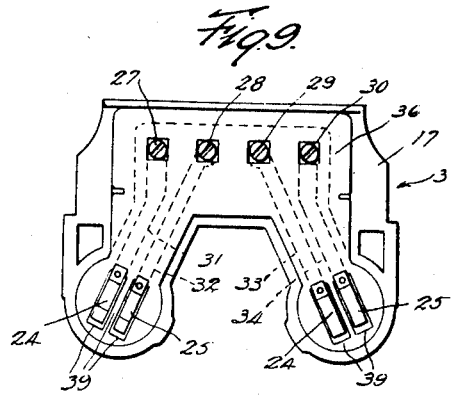
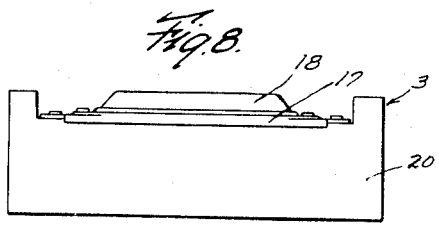
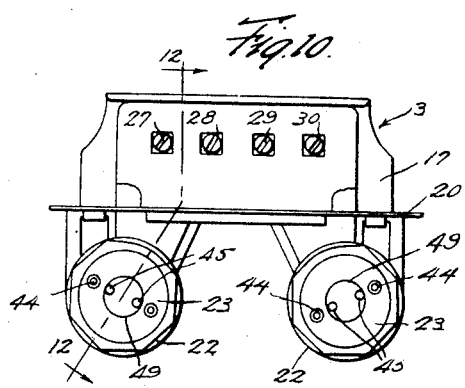
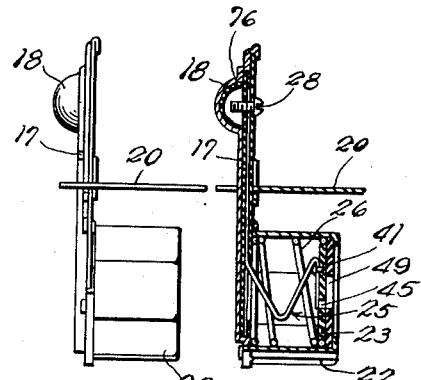
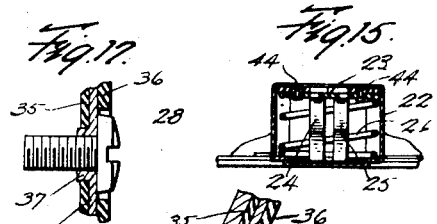
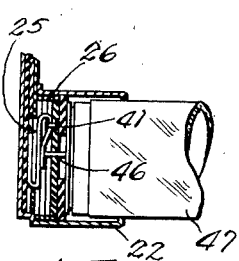
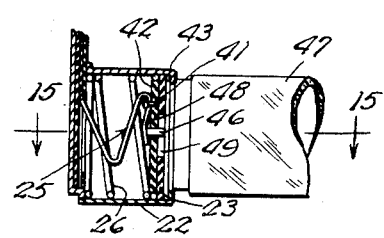
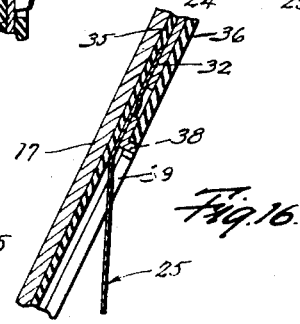

May 13, 1952  A. P. LEINEN  2,596,337
FIXTURE AND HOLDER FOR FLUORESCENT LAMPS
Original Filed March 22, 1946  4 Sheets-Sheet 4
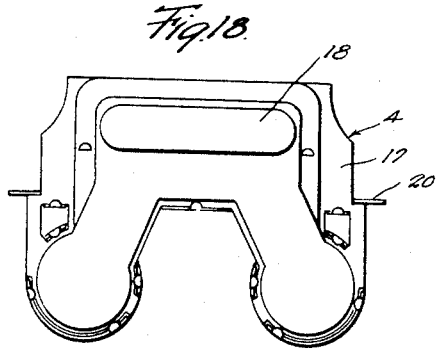
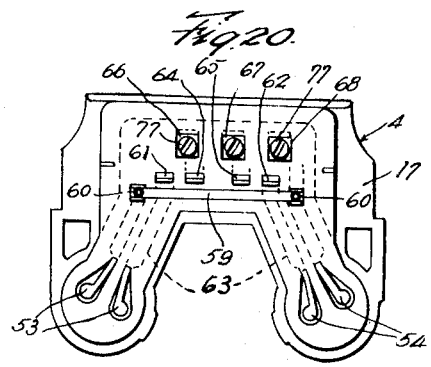
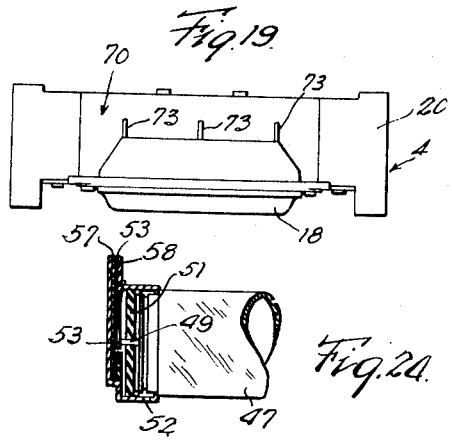
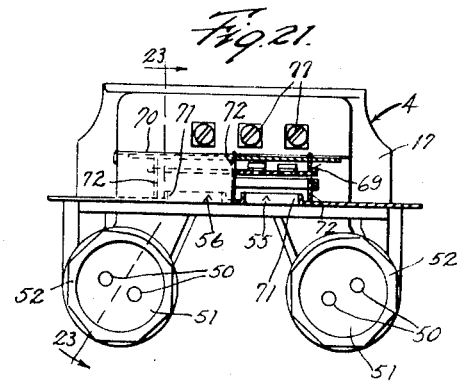
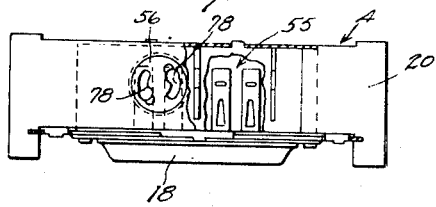
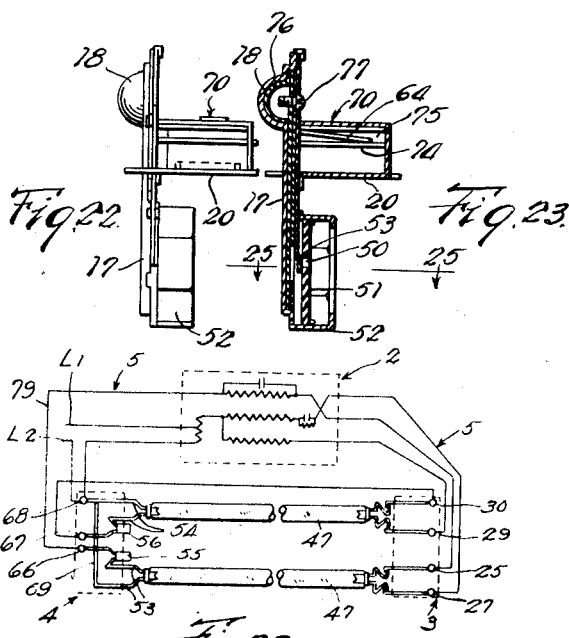
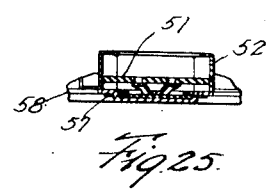

Patented May 13, 1952

2,596,337

UNITED STATES PATENT OFFICE 2,596,337

FIXTURE AND HOLDER FOR FLUORESCENT LAMPS

Arthur P. Leinen, Chicago, Ill., assignor to Benjamin Electric Manufacturing Company, Des Plaines, Ill., a corporation of Illinois Original application March 22, 1946, Serial No. 656,402. Divided and this application January 21, 1949, Serial No. 71,854

10 Claims. (Cl. 240—51.11)

My invention relates to fixtures and holders for fluorescent lamps.

This application is a division of my co-pending application Serial No. 656,402, filed March 22, 1946.

One of the objects of my invention is to provide in a lighting fixture improved means for holding fluorescent lamps in mechanically and electrically connected condition.

A further object is to provide such a construction in which means are provided for preventing the lamps from falling out of the sockets if they are accidentally or inadvertently shifted endwise.

A further object is to provide such a construction in which only the sockets at one end of the lamp are designed to be initially engaged by the lamp.

A further object is to provide an improved construction of lamp holder.

A further object is to provide an improved construction of lamp holder and starter switch receptacle.

Further objects and advantages of the invention will be apparent from the description and claims.

In the drawings, in which an embodiment of my invention is shown,

Fig. 2 is a section on the line 2—2 of Fig. 1;

Fig. 3 is an end view from the left of Fig. 2;

Fig. 4 is a vertical sectional view showing the wing nut turn-button connection between the hood and reflector;

Fig. 5 is a detail plan view of the construction shown in Fig. 4;

Fig. 6 is a bottom plan view of the construction shown in Fig. 4;

Fig. 7 is a rear elevational view of the floating base lamp holder;

Fig. 8 is a top plan view of the construction shown in Fig. 7;

Fig. 9 is a front elevational view of the lamp holder with the sockets and shelf removed;

Fig. 10 is a front elevational view of the lamp holder with the sockets and shelf in place;

Fig. 11 is a side view of the floating base lamp holder;

Fig. 12 is an axial sectional view of the holder;

Fig. 13 is an axial sectional view of the socket with the lamp about to be inserted;

Fig. 14 is an axial sectional view of the socket and lamp end with the lamp pressed inwardly to its extreme position;

Fig. 15 is an axial sectional view of the socket on the line 15—15 of Fig. 13;

Fig. 16 is an enlarged sectional view showing a portion of the connection between the wiring terminal and lamp-engaging contact;

Fig. 17 is an enlarged sectional view of one of the binding terminals;

Fig. 18 is a rear elevational view of the non-floating base lamp holder;

Fig. 19 is a plan view of the construction shown in Fig. 18;

Fig. 20 is a front elevational view of the lamp holder with the lamp sockets and shelf removed;

Fig. 21 is a front elevational view of the lamp holder with the lamp sockets and shelf in place;

Fig. 22 is a side elevational view of the lamp holder;

Fig. 23 is a vertical axial sectional view of the lamp holder;

Fig. 24 is an axial sectional view of the lamp holder with the lamp end inserted.

Fig. 25 is a sectional view of the lamp socket on the line 25—25 of Fig. 23;

Fig. 26 is a top plan view of the lamp holder; and

Fig. 27 is a wiring diagram of the lamp and ballast circuit.

Figure 1:
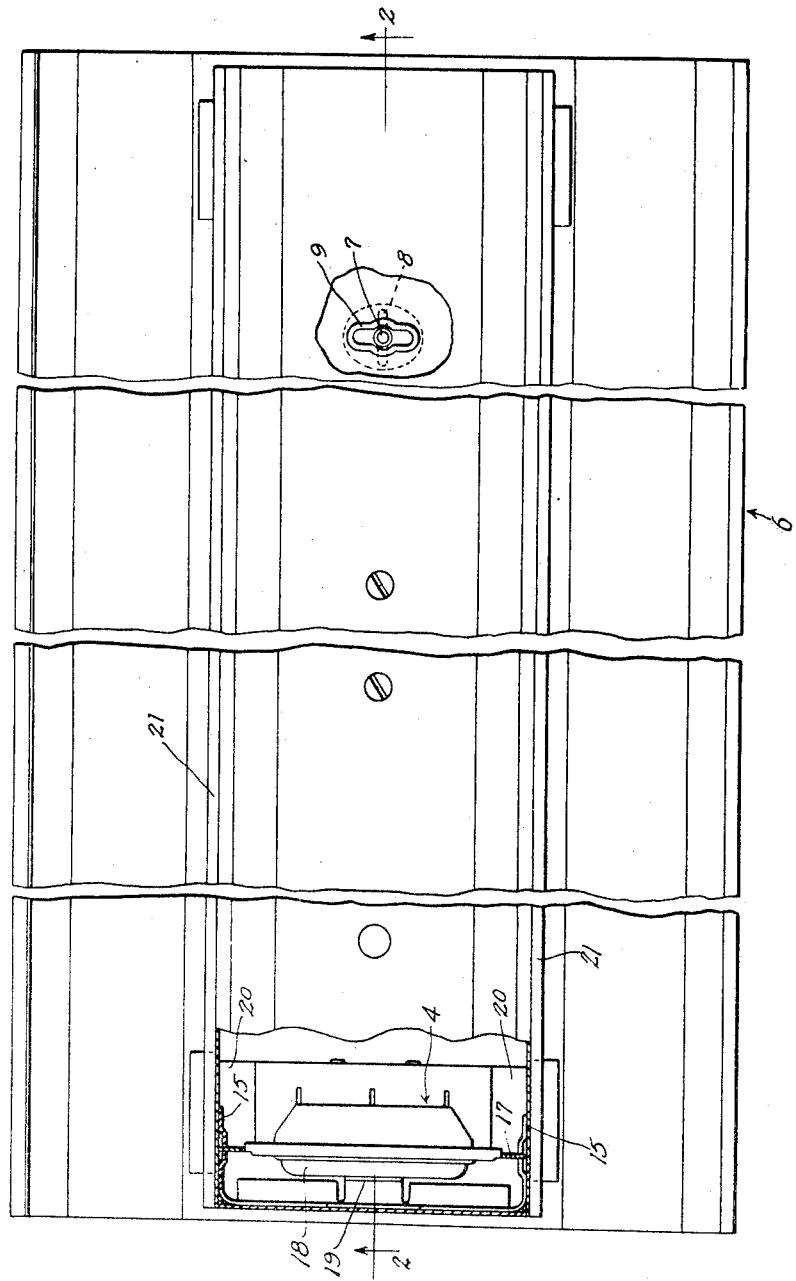
Figure 1 is a plan view of a lighting fixture embodying my invention, parts being broken away.

The construction shown comprises a channel-like hood 1 in which the ballast 2, lamp holders 3 and 4 and wiring 5 are housed and which supports the reflector 6. The plural lamp holder 3 detachably mounted on one end of the hood has floatably mounted contacts for engaging the end lamp contacts, and the plural lamp holder and starter switch holder 4 is detachably mounted on the other end of the hood or channel and has relatively fixed contacts for engaging the end lamp contacts. Suspension weld bolts 7 and thumb nuts 8 are provided for detachably securing the reflector to the hood.

The weld bolts 7 are welded at their upper ends to the top of the hood. Their lower ends extend downwardly toward the keyhole slots 9 in the top of the reflector. On the lower end of each bolt is threaded the turn-button wing nut 8, the wings 10 of which may pass the keyhole slots when the nuts are turned into alignment therewith and which may not pass therethrough when the nuts are not in alignment therewith. The eyelet which is riveted to the edges of the keyhole slot 9 has four sloping shoulders 11, along which the wings of the wing nut ride as it is screwed onto the bolt, the shoulders being shaped to provide abrupt drops or depressions 12 therebetween into which the wings of the nut may enter when turned at right angles to the keyhole slots.

In order to enable the securing and removal of the reflector with respect to the hood without removing the lamp holders, the reflector is provided with openings 13 and 14 large enough to enable the passage of the lower ends of the holders 3 and 4 therethrough.

In connecting the reflector to the hood, the wing nuts 8 are turned to bring the wings into alignment with the keyhole slots 9 and the reflector is moved up toward the hood to bring the keyhole slots opposite the wings of the wing nut. The lamp holders 3 and 4 which pass through the openings 13 and 14 in the upper part of the reflector assist in guiding the slots 9 into position. The reflector is then pushed still further toward the hood, the wings of the wing nut 8 passing through the keyhole slots. The reflector is then held firmly in position against the side edges of the hood and the wing nuts 8 are tightened up until they hold the reflector snugly against the side edges of the hood. They may be tightened up sufficiently to spring the upper portion of the reflector slightly to provide a spring-pressed engagement between the reflector and hood. The wing nuts are finally turned to a position in which the wings enter the depressions 12, thereby holding the wing nuts against turning and holding the reflector securely in position.

When the reflector is removed from the hood, the holders 3 and 4 may be readily attached and detached with respect to the hood. For this purpose, sheet metal brackets are secured to the ends of the hood, each of which brackets is provided with a pair of extensions 15, each extension 15 having a downwardly opening guide slot 16 therein into which the lateral edges of the end or base plates 17 of the holders slip in assembly. For latching each plate 17 in assembled position, it is provided with a laterally-extending embossed keeper 18 which co-operates with a leaf spring latch member 19 which may be formed integrally with the end bracket.

As the holder is pushed up into position, the latch member 19 snaps in below the keeper 18 and latches the holder in position. For supporting and positioning the holder in the hood, it is provided with a horizontal shelf 20 rigidly secured to the plate 17, the laterally-extending ends of which, when the reflector is in place, lie between the lateral flanges 21 of the hood and the top of the reflector 6. Each lamp holder 3 has two sockets for co-operation with two lamps, though it may readily be designed to take care of other numbers of lamps.

The floating base lamp holder 3 comprises the vertically disposed sheet metal housing and lamp supporting base member 17 detachably secured to the hood, a pair of sheet metal octagonal casing members 22 permanently secured thereto for housing the floating insulating contact-carrying bases 23 and associated apparatus, respectively, and the positioning, wire-deflecting and light-shielding shelf 20 permanently secured to said base member for positioning the holder with respect to the hood and reflector, keeping the wiring out of the way of the lamp holders and closing the opening 13 in the reflector, provided for holder clearance in putting the reflector in place on the hood.

Each lamp socket of the holder comprises a two-layer insulating floating base 23 of sheet material, a pair of spring sheet metal contact and connector members 24, 25 riveted to the floating base, and a coil compression spring 26 fitting inside the casing and urging the floating base toward the open end of the casing. The inner ends of the contact and connector members of the two sockets are connected, respectively, with the four binding terminals 27, 28, 29 and 30 adjacent the upper end of the vertical base member by means of sheet metal connector members 31, 32, 33 and 34, respectively. These connector members are placed between two sheets 35 and 36 of insulating material. The inner sheet 35 is perforated to provide openings to receive threaded eyelets 37 on the connector members 31, 32, 33 and 34 into which eyelets the shanks of the binding screws 27, 28, 29 and 30 are threaded, thus definitely positioning the upper ends of the connector members (Fig. 17). The outer insulating sheet 36 is provided with rectangular openings to receive the heads of the binding screw and to provide a space to enable the bared ends of the conductors to be wound around the shanks of the binding screws. The lower ends of the connector members are turned outwardly at 38 (Fig. 16) and extend into notches formed at the upper end of the slot 39 in the outer insulating member 36. The inner ends of the contact and connector members 24, 25 are inserted through the slots 39, respectively, and slipped under the lower ends of the connector members 31, 32, 33 and 34, respectively, to provide an electrical connection from the binding screws 27, etc., to the leaf spring contact portions 40 of the members 24, 25. The contact and connector members 24, 25 are secured to the floating base 23 by means of rivets or eyelets 41. The outer end of the coil compression spring fits around the disc-like insulating member 42 of the base 23 and bears on the outer edge of the annular insulating member 43 which extends beyond the edge of the disc 42. The annular member 43 and the disc-like member 42 are riveted together at 44. The inner disc-like member 42 is provided with a pair of openings 45 therethrough through which the contact pins 46 on the lamp 47 enter for engagement with the leaf spring contacts 48. The central opening 49 in the annular insulating member 43 has a diameter sufficient to permit the entering of the two contact pins 46 which, when thus entered, will engage the outer face of the inner insulating member 42 so that by turning the lamp the contact pins will be guided so as to register properly with the two holes 45 in the inner insulating member to enable the pins to enter through these openings and engage the spring contacts 48. The floating base 23 may then be pushed inwardly by exerting endwise pressure on the lamp from the position shown in Fig. 13 to the position shown in Fig. 15, the yielding movement of the floating base 23 being sufficient to enable the lamp to be moved endwise so that the contact pins 49 at the other end of the lamp can swing clear of the lamp holder 4 at the other end of the lamp until the contact pins 49 of the other end of the lamp have been brought into alignment with the openings 50 in the nonfloating cover 51 of the holder 4. As the contact pins 46 at one end of the lamp are in alignment, respectively, with the contact pins 49 at the other end of the lamp, and as the contact-receiving openings 45 of the floating base are in alignment, respectively, with the contact-receiving openings 50 of the nonfloating cover 51, it follows that since the contact pins 46 at the floating base end have been entered into the contact-receiving openings 45, the contact pins 49 at the other end of the lamp will align with the contact-receiving openings 50 of the nonfloating base or cover 51, so that when endwise pressure on the lamp 47 is released, the coil compression spring 26 will push the floating base 23 and lamp 47 over toward the nonfloating base and cause the contact pins 49 on the lamp to enter the contact-receiving holes 50 on the nonfloating base and engage the leaf spring contacts on the nonfloating base. The bases 23 and 51 are octagonal in shape to conform to the shape of the octagonal casings in which they are mounted, to hold the bases against rotation in the casing.

The plural lamp holder and starter switch holder 4 is similar in many respects to the lamp holder 3 just described. It comprises the vertically disposed sheet metal housing and lamp supporting member 17 detachably secured to the hood 1 and a pair of lamp sockets, each comprising a sheet metal hexagonal casing member 52 permanently secured to the member 17 for housing the insulating cover and contact-positioning disc 51 and the lamp-engaging contacts 53 and 54, a positioning wire-deflecting and light screen apron or shelf 20, permanently secured to the base member 18, and a pair of starter switch holders 55 and 56 mounted above the shelf 20.

The electrical contacts 53 and 54 are in general in the form of flat metal ribbons clamped between two insulating sheets 57 and 58. The outside ones of the contacts 53 and 54 of the lamp holders are electrically connected by a metal ribbon 59 (Fig. 20) clamped between these insulating sheets, this ribbon being riveted or eyeleted at its ends at 60 to the connector and contact members 53 and 54 (Fig. 20). The contacts 61 and 62 of the starter switches, respectively, and the inside ones of the contacts 53 and 54 of the lamp holders, respectively, may be electrically connected by connector portions 63, each connector portion, starter switch engaging contact and lamp engaging contact being formed of an integral ribbon-like strip of metal. The contacts 64 and 65, respectively, of the two starter switch sockets may be electrically connected with the binding terminal plates 66 and 67, each binding plate and its associated starter switch contact being formed of a single integral piece of sheet metal. The crossbar connector 59 may be electrically connected with the binding plate 68 by means of an integral extension of the binding plate riveted to this crossbar. The starter switch sockets comprise the aforesaid starter switch engaging contacts 61, 62, 64 and 65 and a honeycomb housing or casing 69 therefor. This honeycomb housing fits inside a U-shaped casing 70 formed as an integral part of the shelf or apron 20. The shelf or apron is provided with a pair of positioning entrance openings 71 for the insertion of the starter switches. The honeycomb casing comprises three vertical partitioning members 72 of sheet metal having tongues 73 engageable with slots in the U-shaped casing 70 (Fig. 19) and a pair of horizontal insulating sheets 74, 75 (Fig. 23) in honeycomb relation to the vertical partitions 72 between which insulating sheets the contacts 61, 62, 64, 65 for the starter switches enter.

In order to prevent short circuiting, an insulating channel-like shield 76 may be inserted inside the embossment 18 underneath the binding screws 27, 28, 29, 30, and 77.

The starter switch is inserted into the starter receptacle by bringing the enlarged heads on the starter switch contacts into alignment with the enlarged portions of the keyhole slots 78 in the partition to bring the switch contacts into engagement with the receptacle contacts 61, 64, 65 and 62. The switch is then turned to move the necks of the headed contacts into the restricted parts of the keyhole slots 78.

Referring to Fig. 27, which shows a wiring diagram, the terminals 27, 25 and 29 of the lamp holders 3 are connected with the ballast 2, as shown, the terminal 30 being connected with the binding plate 67 of the starter switch receptacle 56. The binding terminal 68 of the lamp holder contact 54 is connected with the line $L^2$. The binding terminal 66 is connected with the ballast by the conductor 79.

In use, when the current is turned on, the lamps perform in the usual manner, the filaments at the ends of the lamps being initially heated until, by the operation of the starter switch, discharge is initiated through the tube between the filaments.

Further modifications will be apparent to those skilled in the art and it is desired, therefore, that the invention be limited only by the scope of the appended claims.

Having thus described my invention, what I claim and desire to secure by Letters Patent is:

1. A device for use with a lighting fixture having an elongated reflector, an elongated hood above said reflector and an elongated fluorescent lamp having end pin contacts, said device having means for electrical and mechanical connection with the lamp, and means for supporting the connecting means in the reflector comprising a substantially vertical metal plate extending transversely of the reflector and hood and having a lower part lying within the reflector for supporting the contact means and an upper part lying within the hood, an insulating layer of sheet material juxtaposed in front of said plate both in the hood and in the reflector, ribbon-like conductors extending from the hood into the reflector superposed on said insulating layer, binding terminals for said conductors at the upper end thereof within the hood, a second insulating layer of sheet material superposed on the upper portions of said conductors and electrical connections from said ribbon-like conductors to the lamp-engaging contacts.

2. A device for use with a lighting fixture having an elongated reflector, an elongated hood above said reflector and an elongated fluorescent lamp having end pin contacts, said device having means for electrical and mechanical connection with the lamp, and means for supporting the connecting means in the reflector comprising a substantially vertical metal plate extending transversely of the reflector and hood and having a lower part lying within the reflector for supporting the contact means and an upper part lying within the hood, an insulating layer of sheet material juxtaposed in front of said plate both in the hood and in the reflector, ribbon-like conductors extending from the hood into the reflector superposed on said insulating layer, binding terminals for said conductors at the upper end thereof within the hood, a second insulating layer of sheet material superposed on the upper portions of said conductors and electrical connections from said ribbon-like conductors to the lamp-engaging contacts comprising ribbon-like conductors having their inner ends extending between said insulating layers for contact with said first ribbon-like conductors.

3. A device for use with a lighting fixture comprising an inverted channel-like hood and an inverted channel-like reflector having its upper face detachably secured adjacent the lower edges of the hood, said device having means for supporting an elongated cylindrical fluorescent lamp in said reflector comprising a holder having means lying within the reflector for detachable electrical and mechanical engagement with the end of the lamp and having supporting means for said holder extending from within the reflector into the hood, said supporting means and hood having cooperating latch means for securing the holder in position brought into engagement by upward movement of said supporting means with respect to said hood, said supporting means comprising housing and supporting means for at least part of the conductors leading from the hood to the means for electrical engagement with the lamp.

4. A device for use with a lighting fixture comprising an inverted channel-like hood and a reflector having its upper face detachably secured adjacent the lower edges of the hood, said device having means for supporting an elongated cylindrical fluorescent lamp below said reflector comprising a holder having means lying below the reflector for detachable electrical and mechanical engagement with the end of the lamp and having supporting means for said holder extending from below the reflector into the hood, said supporting means and hood having cooperating latch means for securing the holder in position brought into engagement by upward movement of said supporting means with respect to said hood, said supporting means comprising housing and supporting means for at least part of the conductors leading from the hood to the means for electrical engagement with the lamp.

5. A device for use with a lighting fixture comprising an inverted channel-like hood and a reflector having its upper face secured adjacent the lower edges of the hood, said device having means for supporting an elongated cylindrical fluorescent lamp in said reflector comprising a holder having means lying within the reflector for detachable electrical and mechanical engagement with the end of the lamp and having supporting means extending from within the reflector into connection with the hood, said holder being provided with positioning means rigid with respect thereto clamped between the lower part of the hood and the upper part of the reflector, said supporting means comprising housing and supporting means for at least part of the conductors leading from the hood to the means for electrical engagement with the lamp.

6. A device for use with a lighting fixture comprising an inverted channel-like hood and an inverted channel-like reflector having its upper face secured adjacent the lower edges of the hood, said device having means for supporting an elongated cylindrical fluorescent lamp in said reflector comprising a holder having means lying within the reflector for detachable electrical and mechanical engagement with the end of the lamp and having supporting means extending from within the reflector into the hood, said supporting means and hood having cooperating latch means for securing the holder in position by upward movement of said supporting means with respect to said hood, said holder being provided with positioning means rigid with respect thereto clamped between the lower part of the hood and the upper part of the reflector, said supporting means comprising housing and supporting means for at least part of the conductors leading from the hood to the means for electrical engagement with the lamp.

7. A device for use with a lighting fixture comprising an inverted channel-like hood, said device having means for supporting an elongated cylindrical fluorescent lamp below said hood comprising a holder having means lying below the hood for detachable electrical and mechanical engagement with the end of the lamp and having supporting means for said holder extending from below the hood into the hood and having housing and supporting means for at least part of the conductors leading from the hood to the means for electrical engagement with the lamp, said supporting means and hood having cooperating latch means for securing the holder in position brought into engagement by upward movement of said supporting means with respect to said hood.

8. A device for use with a lighting fixture comprising an inverted channel-like hood, said device having means for supporting an elongated cylindrical fluorescent lamp below said hood comprising a holder having means lying below said hood for detachable electrical and mechanical engagement with the end of the lamp and having supporting means for said holder extending from below the hood into the hood and having housing and supporting means for at least part of the conductors leading from the hood to the means for electrical engagement with the lamp, said supporting means and hood having cooperating latch means for securing the holder in position, said supporting means and hood having cooperating guide means for guiding the latch means to latching position, said latch means being brought into engaging position by upward movement of said supporting means with respect to said hood.

9. A device for use with a lighting fixture comprising an inverted channel-like hood, said device having means for supporting an elongated cylindrical fluorescent lamp below said hood comprising a holder having means lying below the hood for detachable electrical and mechanical engagement with the end of the lamp and having supporting means extending from below the hood into the hood and having housing and supporting means for at least part of the conductors leading from the hood to the means for electrical engagement with the lamp, said supporting means and hood having cooperating latch means for securing the holder in position brought into engagement by upward movement of said supporting means with respect to said hood, said supporting means comprising a generally vertical plate extending transversely of the hood on the lower part of which plate the lamp-engaging means are secured and the upper part of which plate carries part of the cooperating latch means.

10. A device for use with a lighting fixture comprising an inverted channel-like hood, said device having means for supporting an elongated cylindrical fluorescent lamp below said hood comprising a holder having means lying below the hood for detachable electrical and mechanical engagement with the end of the lamp and having supporting means for said holder extending from below the hood into the hood and having housing and supporting means for at least part of the conductors leading from the hood to the means for electrical engagement with the lamp, said supporting means and hood having cooperating latch means for securing the holder in position brought into engagement by upward movement of said supporting means with respect to said hood, said supporting means comprising a generally vertical plate extending transversely of the hood on the lower part of which plate the lamp-engaging means are secured and the upper part of which plate carries part of the cooperating latch means, said plate and hood having cooperating guide means for guiding the latch means to latching position.

ARTHUR P. LEINEN.

REFERENCES CITED

The following references are of record in the file of this patent:

UNITED STATES PATENTS

| Number | Name | Date |
|---|---|---|
| 420,706 | Stewart | Feb. 4, 1890 |
| 2,261,170 | MacCarthy | Nov. 4, 1941 |
| 2,285,175 | Sparling | June 2, 1942 |
| 2,290,701 | Mueller | July 21, 1942 |
| 2,323,073 | Netting | June 29, 1943 |
| 2,384,956 | Mueller et al. | Sept. 18, 1945 |
| 2,393,180 | Merrill | Jan. 15, 1946 |
| 2,399,501 | Mueller et al. | Apr. 30, 1946 |
| 2,464,643 | Kulka | Mar. 15, 1949 |